3,359,769
BEVEL GEAR GENERATOR
Vladimir Andreevich Kotov, Nickolai Alexeevich Shljapin, and Igor Ivanovich Kirichinsky, Moscow, U.S.S.R., assignors to Nauchno-Issledovatelsky Institute Tekhnologii avtomobilnoi promyshlennosti, Moscow, U.S.S.R.
Filed Oct. 14, 1964, Ser. No. 403,850
1 Claim. (Cl. 72—200)

ABSTRACT OF THE DISCLOSURE

Bevel gear generator having a synchronizer with two intermeshed bevel gear wheels and a faceplate with an arbor for a bevel gear blank. The said faceplate is fastened to one of the gear wheels of said synchronizer. A pressure tool is secured to the other gear wheel of said synchronizer on the side directed to said faceplate so that the pressure tool will cooperate with said gear blank mounted on said faceplate. A clamping attachment is provided for holding the gear blank on the faceplate datum surface and preventing said blank from undergoing vertical displacements during tooth rolling. A means is also provided for preventing the gear blank from undergoing radial and similar shifts caused by the forces arising in tooth rolling. Three pushers are incorporated in the faceplate for elevating the gear blank from the datum surface of the faceplate into a position providing for proper heating of the gear blank by means of a heating apparatus.

---

The present invention relates to bevel gear generators, in which a relative rolling motion takes place between a bevel gear blank held on an arbor and a pressure tool which produces depressions on the gear blank surface, the shape of these depressions corresponding to the shape of the pressure tool teeth.

In rolling teeth by the above mentioned method the gear blank is subjected to radial and similar forces produced by the pressure tool. These forces are taken up by the arbor which bears a workpiece. Due to a comparatively small diameter of the arbor usually made from a material whose rigidity is not lower than that of the workpiece material, said forces affect small areas of the gear blank internal surface which is in contact with the arbor, thus bringing about a deformation of the internal surface of the gear blank, as well as a considerable change in its original geometric shape. As a result, a gap is formed between the external surface of the arbor and the internal surface of the workpiece. This gap causes shifting of the gear blank in radial and similar directions during the process of tooth rolling. Simultaneous rotation and shifting of the gear blank produces a combined complex motion, which affects adversely the quality of the teeth, and consequently, the quality of the bevel gears produced. Hence, the degree of accuracy in gear tooth generation is decreased.

An object of the present invention is to increase the degree of accuracy of bevel gear tooth rolling.

The primary object of this invention is to avoid radial and similar shifts of bevel gear blanks in rolling teeth on bevel gear generators. In accordance with the invention, this is achieved by means of a special external attachment which prevents a gear blank from radial and similar shifts caused by the forces which arise in the tooth rolling process. This external attachment takes up said forces, thus unloading the arbor and precluding deformation of the gear blank internal surface coming into contact with said arbor.

According to the proposed method the teeth can be generated both in cold and in hot state.

When rolling teeth in cold state, the gear blank and the external attachment preventing the blank from shifting should be arranged one in relation to the other with a negative allowance.

When rolling teeth in hot state, the gear blank and said external attachment should be positioned relative to one another with a positive allowance. The amount of the allowance should be selected so as to account for the increase in the gear blank diameter due to heating. To ensure convenience in heating the gear blank when rolling teeth in hot state, and particularly, when the gear rim is close to the gear face datum surface, it is advisable to elevate the blank from its working place into the position where said external attachment would not interfere with the blank heating. The gear blank can be heated by means of an inductor fed with high-frequency electric current, or by the use of some other heating apparatus. When the workpiece is arranged in the elevated position, no special complex apparatus is required for the heating of its area to be machined into the future rim of the gear, whereas when in the lowered position, due to the presence of the above attachment a simple heating apparatus will provide for heating (through direct transmission of heat) of only a part of the required blank area to be warmed, and it will take much time to heat the apparatus to the required temperature. For this reason, the gear blank may be heated to a rather high temperature and the subsequent rolling of teeth may involve its deformation, and consequently, a decrease in tooth rolling accuracy as compared to tooth rolling accuracy according to the proposed method.

The rolling of bevel gear teeth by known methods is accomplished on gear generators comprising the following parts: a synchronizer, one of whose gear wheels bears a pressure tool, and the other—a bevel gear blank carried on the arbor of a face plate secured to the second gear wheel, and a clamping fixture, for instance, a draw-in attachment designed to hold a workpiece on the faceplate datum surface during tooth generation, mainly to prevent said workpiece from vertical displacements. To carry out the proposed method, gear generators of the above type should be provided with an attachment preventing the gear blank from shifting in radial and similar directions.

One of the versions of such a gear generator is equipped with a faceplate having a circumferential annular bead projecting over its datum surface.

When a gear generator is designed for cold rolling of teeth, the inside diameter of the faceplate bead should be smaller than the blank flange outside diameter by the value ensuring for an arrangement of the blank in the bead with a negative allowance. On the contrary, if a gear generator is designed for hot rolling of teeth, the inside diameter of the faceplate should be larger than the outside diameter of the blank flange by the value accounting for the increase in the size of the blank due to heating.

In both above cases the profile of the internal surface of the bead should be equidistant with the profile of the external surface of the blank flange.

According to the proposed method, a gear generator for hot rolling of teeth should be provided with an attachment to elevate a gear blank for the period of time the latter is being heated.

As a version of this attachment, a knock-out may be suggested which contains at least three pushers incorporated in the face plate and controlled by means of a bar pivotally connected to each of these pushers and accommodated inside the shaft of the synchronizer gear wheel which bears the faceplate.

It is believed that the present invention will be clearly understood from the following description of a preferred embodiment thereof and the accompanying drawings wherein.

Figure 9:
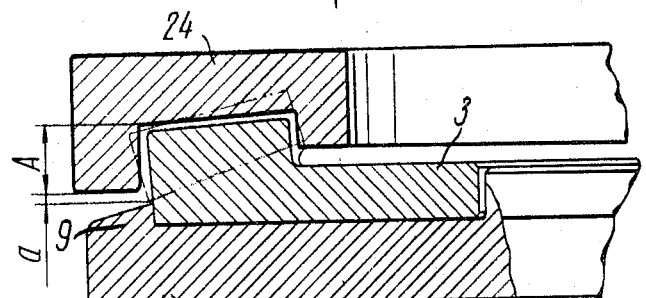
Figure 8:
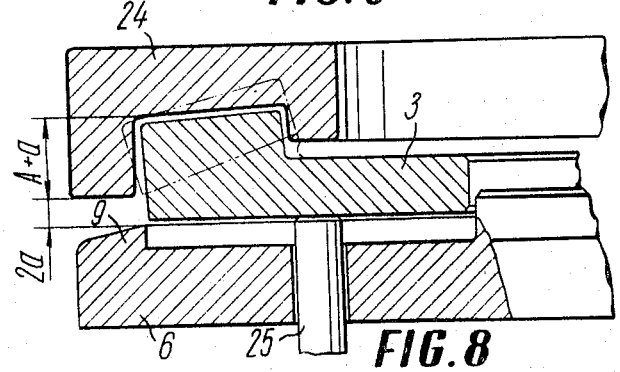
Figure 6:
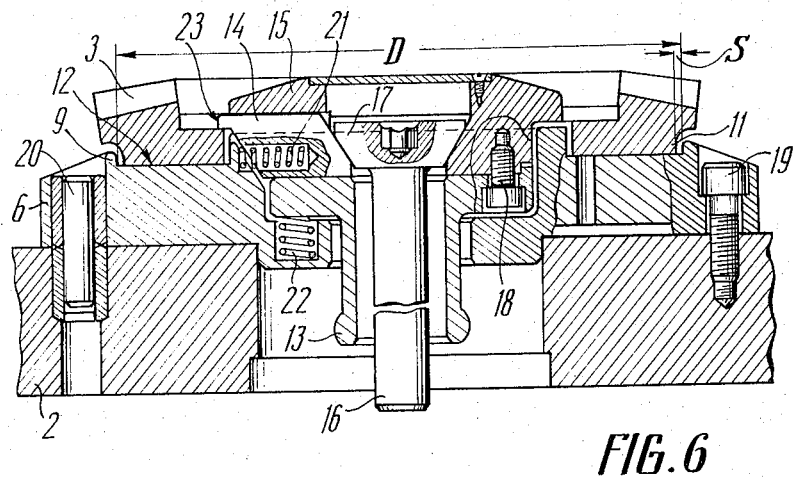
FIG. 6 illustrates a faceplate fastened to a lower gear wheel of a synchronizer and bearing a bevel gear blank secured by means of a draw-in clamping attachment.
Figure 7:
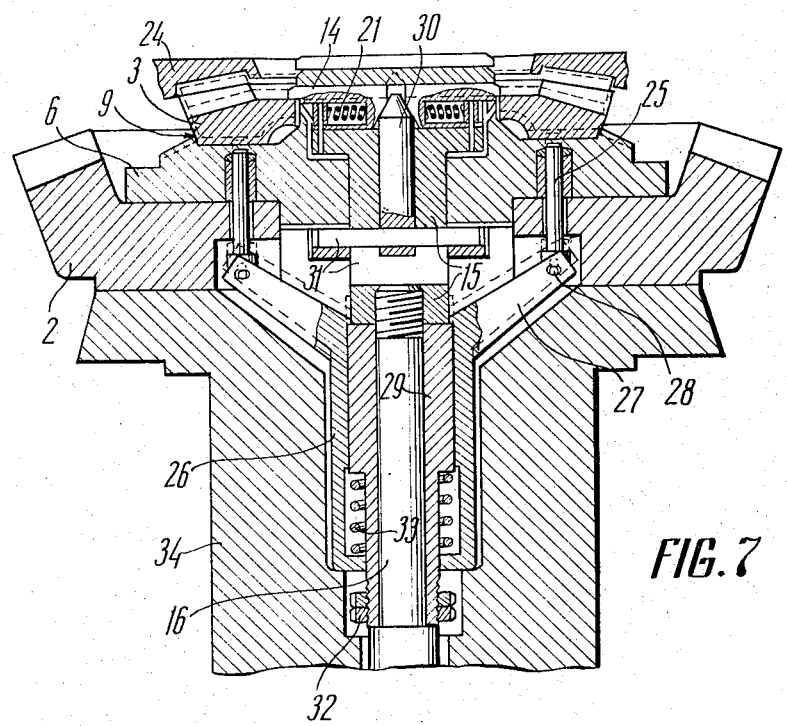

FIG. 7—same as FIGURE 6, showing in addition a heating apparatus and an attachment for elevating a bevel gear blank into the position for heating;

FIGS. 8 and 9 schematically show an arrangement of a heating apparatus relative to a bevel gear blank both in case a gear generator has an attachment for elevating a gear blank and in case the generator has no such attachment.

Figure 1:
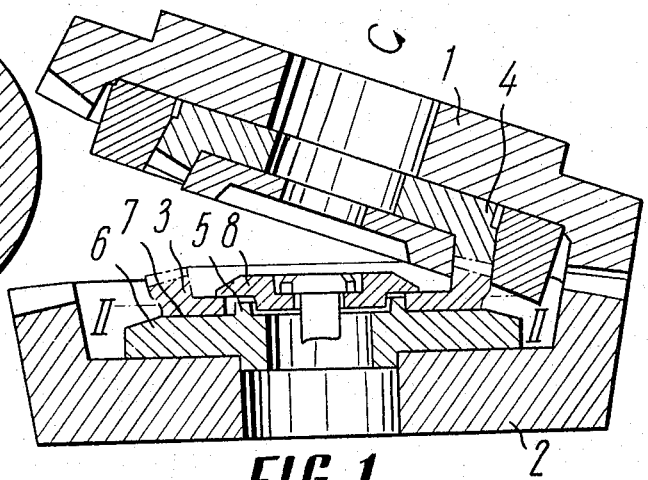
FIG. 1 illustrates the main unit of a gear generator designed for rolling bevel gear teeth by the conventional method.
Figure 3:
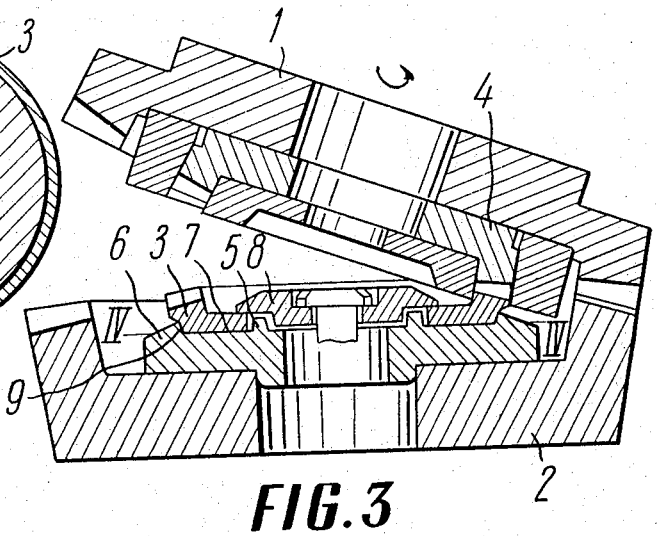
FIG. 3 illustrates the main unit of a gear generator for cold rolling of bevel gear teeth by the proposed method.

Bevel gear teeth are produced on a gear generator by the proposed method through a relative rolling motion of bevel gear blank 3 and pressure tool 4, their rotation being achieved by means of a synchronizer comprising two intermeshed gear wheels 1 and 2 (FIGS. 1 and 3). Prior to rolling, bevel gear blank 3 is arranged on arbor 5 which is made integral with faceplate 6 fastened to gear wheel 2. In order to hold bevel gear blank 3 on datum surface 7 of faceplate 6, draw-in clamping attachment 8 is applied. All the listed parts of the gear generator are used in the rolling of bevel gear teeth by both known and proposed methods.

Figure 2:
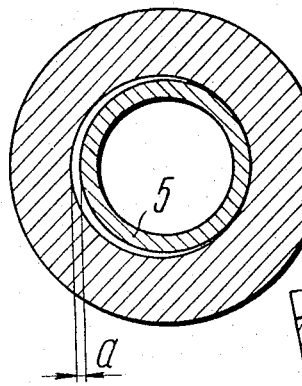
FIG. 2 is a section on line II—II of FIGURE 1.

When rolling teeth by the known method, radial and similar forces, acting on a bevel gear blank (FIGS. 1 and 2), are taken up by arbor 5. In this case the internal surface of bevel gear blank 3 is deformed and increases in diameter by a certain value $a$ (FIG. 2). This makes the rotating blank move in the horizontal direction during tooth generation. The resulting complex movement of the gear blank affects the quality of the produced teeth and the profile of the teeth is distorted.

Figure 4:
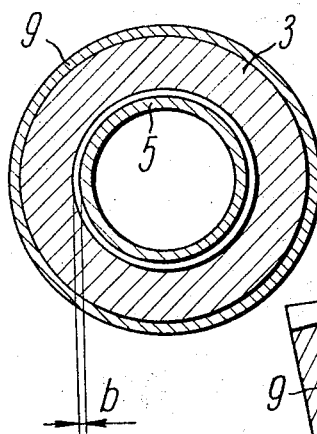
FIG. 4 is a section on line IV—IV of FIGURE 3.
Figure 5:
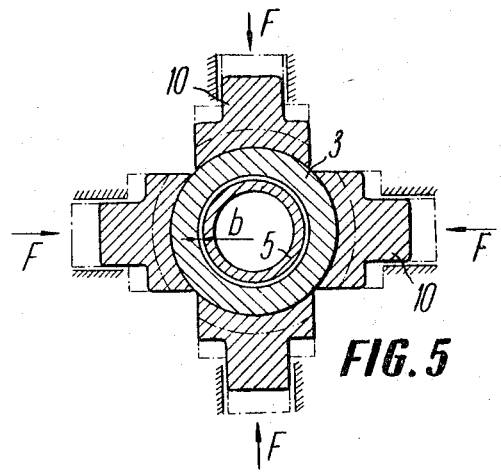
FIG. 5 shows one of the versions of an attachment for preventing a bevel gear blank from shifting in radial and similar directions during tooth generation.

When rolling teeth by the proposed method, gear blank 3 is prevented from radial and similar shifts; this may be achieved by means of any external attachment, for example, by means of annular bead 9 on faceplate 6 as shown in FIGS. 3 and 4, with the help of pneumatic or hydraulic clamps 10 as shown in FIG. 5, etc.

When rolling teeth in cold state, the gear blank and the external attachment should be positioned one in relation to the other with a negative allowance (FIGS. 3 and 4). The forces arising in the rolling of teeth are taken up by the external attachment; as a result, arbor 5 is unloaded. The clearance $b$ between the external surface of arbor 5 and the internal surface of the gear blank remains practically unchanged, the internal surface of the gear blank is not deformed, and the tooth rolling accuracy is increased.

FIG. 6 shows faceplate 6 with head 9 projecting upward, the faceplate shown being designed for hot rolling of bevel gear teeth. In this case the inner diameter D of faceplate bead 9 is larger than the outer diameter of gear blank flange 11 by the value equal to the double radial clearance S.

When the gear blank is heated, its dimensions increase and the clearance S disappears.

It is also seen from FIG. 6 that the profile of the internal surface of bead 9 is equidistant with the profile of the external surface of gear blank flange 11.

To hold gear blank 3 on datum surface 12 of faceplate 6 during teeth generation, a draw-in clamping attachment is applied, said attachment comprising spring-loaded socket 13, clamp lugs 14 accommodated in casing 15, and rod 16 with tapered head 17 which engages lugs 14. Socket 13 and casing 15 are coupled to each other with screws 18 and are arranged in faceplate 6 secured to synchronizer lower gear wheel 2 with bolts 19 and pins 20.

The draw-in clamping attachment operates as follows. When rod 16 goes up, springs 21 move clamp lugs 14 to the center of the attachment, while springs 22 raise socket 13 complete with casing 15 so that gear blank 3 is arranged on faceplate datum surface 12. When rod 16 goes down, tapered head 17 moves clamp lugs 14 away from the center of the attachment with the result that lug projecting portions 23 are found to be over the top face of the gear blank, thus pressing the latter against datum surface 12 of the faceplate.

For hot rolling of teeth the heating of a blank is accomplished by means of inductor 24 (FIGS. 7–9) fed with high-frequency electric current. It is advisable to raise gear blank 3 from its working place for the time it is heated. For this purpose, faceplate 6 (FIG. 7) is provided with built-in pushers 25 (at least three pushers) controlled with the help of hollow bar 26. This bar has three offshoots 27, according to the number of pushers 25.

Offshoots 27 and pushers 25 are interconnected with the help of articulated joints 28. Hollow bar 26 can move bushing 29 rigidly connected to rod 16 which controls the draw-in clamping attachment. In this version clamp lugs 14 cooperate with pin 30, and are accommodated in the slots of mushroom-shaped casing 15, said pin 30 (provided with cross-head 31) being stationary, while casing 15 moves along pin 30. When rod 16 and bushing 29 go up, casing 15 also rises, sliding along pin 30. Under the action of spring 21 clamp lugs 14 will move towards the center of the attachment, thus releasing gear blank 3.

In further movement of rod 16 with bushing 29 nuts 32 screwed on bushing 29 will raise bar 26 with pushers 25, which, in turn, will elevate gear blank 3 into the position for heating (as shown by chain-and-dotted lines in FIG. 7). Spring 33 is provided in order to return bar 26 into the initial position. Bar 26 is accommodated in hollow shaft 34 of synchronizer lower gear wheel 2. For the sake of comparison FIGS. 8 and 9 show the arrangement of gear blank 3 and inductor 24 relative to faceplate 6 in the elevated and lowered positions respectively. In the elevated position of gear blank 3 (FIG. 8) the distance $a$ between faceplate bead 9 and the inductor lower surface is increased by two times $(2a)$, and the inductor heating active zone A is also increased by the value $a(A+a)$. This provides for heating the gear blank throughout the entire height of the gear teeth profile (in FIGS. 8 and 9 the profile is shown by chain-and-dotted lines), which results in lesser consumption of electric power in heating gear blanks.

What is claimed is:

A bevel gear generator, comprising: a synchronizer with two intermeshed bevel gear wheels; a faceplate with an arbor for a bevel gear blank, said faceplate being fastened to one of the gear wheels of said synchronizer; a pressure tool secured to the other gear wheel of said synchronizer on the side directed to said faceplate so that the pressure tool will cooperate with said gear blank mounted on said faceplate; a clamping attachment for holding the gear blank on the faceplate datum surface and preventing said blank mainly from vertical displacements during tooth rolling; a means preventing the gear blank from radial and similar shifts caused by the forces arising in tooth rolling; at least three pushers incorporated in said faceplate and intended for elevating said gear blank from the datum surface of the faceplate into the position providing for proper heating of the gear blank by means of a heating apparatus; a bar controlling said pushers, said bar being pivotally connected to each of these pushers and being accommodated inside the shaft of the gear wheel of said synchronizer, said gear wheel bearing said faceplate.

References Cited

UNITED STATES PATENTS

| | | | |
|---|---|---|---|
| 1,240,916 | 9/1917 | Anderson | 80—16.3 |
| 1,240,917 | 9/1917 | Anderson | 80—16.3 |
| 2,443,336 | 6/1948 | Waldie | 72—342 |
| 2,893,459 | 7/1959 | Kosek | 72—342 |

FRANCIS S. HUSAR, *Primary Examiner.*